Patented June 3, 1952

2,599,509

UNITED STATES PATENT OFFICE 2,599,509

5-NITRO-2-FURFURYLIDENE ACETONE SEMICARBAZONE

Franklin L. Austin, Peoria, Ill., and Henry B. Hastie, Norwich, N. Y., assignors to Eaton Laboratories, Inc., Norwich, N. Y., a corporation of New York No Drawing. Application May 31, 1950, Serial No. 165,358

1 Claim. (Cl. 260—345)

This invention relates to a new chemical compound 5-nitro-2-furfurylidene acetone semicarbazone described by the formula

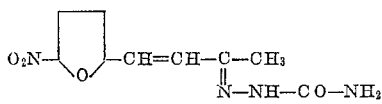

We have made the surprising discovery that this new compound, while sharing the antiseptic properties which are common to many nitrofurans, is distinguished from other nitrofurans having a closely related structure by its effectiveness against infections when administered orally. In doses well below the toxic limit it has proved highly effective in the treatment of streptococcus and trypanosome infections and is a valuable chemotherapeutic agent.

The preparation of the new drug in a form which will permit ready oral administration is easy. It may be incorporated in tablets or in lozenges. Such tablets are compounded in conventional fashion by granulating the drug with standard starch paste, drying, adding dry starch and pressing out the tablets. The lozenges are compounded in conventional fashion also by granulating with sugar syrup and then adding bulk in the form of powdered sugar and dry starch, and a flavoring material.

In order that the invention may be entirely available to those skilled in the art, a method for making it is described briefly:

A solution of 20 grams of furfurylidene acetone in 100 cc. of acetic anhydride was added slowly with stirring to a nitration mixture prepared from 40 cc. of fuming nitric acid and 80 cc. of acetic anhydride. The temperature during addition and for forty-five minutes thereafter was maintained at —25° C. to —30° C.

The reaction mixture was then poured into a large volume of ice-water. The crude product separated as a solid, without the appearance of an intermediate. This was filtered, air-dried and purified by crystallization from ligroin (B. P. 70–90°). Yield 9.0 grams of melting point 113–114° C.

The ketone (1.0 gram) prepared above was dissolved in 50 cc. of ethanol and treated with 1.0 gram of semicarbazide hydrochloride and 1.5 grams of sodium acetate. After heating for ten minutes the solution was cooled and the crude product collected. It was recrystallized from glacial acetic acid. Melting point 234° C. with decomposition.

What is claimed is:

5-nitro-2-furfurylidene acetone semicarbazone represented by the formula:

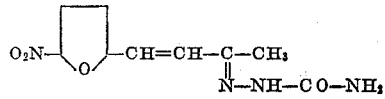

FRANKLIN L. AUSTIN.
HENRY B. HASTIE.

REFERENCES CITED

The following references are of record in the file of this patent:

Dreizen: Chemical Abstracts, vol. 43 (1949), p. 6735.

Dreizen: J. Dental Research, 28, pp. 288–297 (1949).